United States Patent
Lim et al.

(10) Patent No.: US 7,440,435 B2
(45) Date of Patent: Oct. 21, 2008

(54) DIVIDED MAC PROTOCOL STRUCTURE, DATA TRANSMISSION AND RECEPTION METHOD, AND HANDOVER METHOD AND SYSTEM USING THE STRUCTURE IN A WIRELESS COMMUNICATION SYSTEM

(75) Inventors: Geun-Hwi Lim, Seongnam-si (KR); Tae-Won Kim, Yongin-si (KR); Hong-Sung Chang, Suwon-si (KR); Jae-Jeong Shim, Seoul (KR); Jung-Shin Park, Seoul (KR); Yong Chang, Seongnam-si (KR); So-Hyun Kim, Suwon-si (KR); Seung-Il Yoon, Seongnam-si (KR); Yeong-Moon Son, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 705 days.

(21) Appl. No.: 11/072,937

(22) Filed: Mar. 4, 2005

(65) Prior Publication Data

US 2005/0195822 A1   Sep. 8, 2005

(30) Foreign Application Priority Data

Mar. 5, 2004   (KR) ...................... 10-2004-0015987

(51) Int. Cl.
  *H04L 12/28* (2006.01)
  *H04L 12/56* (2006.01)
  *H04L 12/66* (2006.01)
  *H04Q 7/00* (2006.01)
  *H04Q 7/20* (2006.01)

(52) U.S. Cl. ...................... 370/338; 370/349; 370/392; 370/401; 370/469; 370/474

(58) Field of Classification Search ................. 370/338, 370/349, 392, 401, 469, 474
See application file for complete search history.

(56) References Cited

U.S. PATENT DOCUMENTS

| | | | |
|---|---|---|---|
| 6,226,277 B1 * | 5/2001 | Chuah | |
| 6,532,211 B1 * | 3/2003 | Rathonyi et al. | |
| 6,542,490 B1 * | 4/2003 | Ahmadvand et al. | |
| 6,665,718 B1 | 12/2003 | Chuah et al. | |
| 6,744,766 B2 * | 6/2004 | Alapuranen | |
| 6,842,445 B2 * | 1/2005 | Ahmavaara et al. | |
| 6,961,349 B2 * | 11/2005 | Malomsoky et al. | |
| 7,020,822 B2 * | 3/2006 | Ho et al. | |

(Continued)

*Primary Examiner*—Alpus H Hsu
(74) *Attorney, Agent, or Firm*—The Farrell Law Firm, PC (57) ABSTRACT

A divided Media Access Control (MAC) protocol structure, a data transmission and reception method, and a handover method and system using the structure in a wireless communication system for efficiently managing session information in handover of an MSS (Mobile Subscriber Station). In the MAC protocol structure, a MAC is divided into a MAC-high layer and a MAC-low layer. The MAC-high layer performs session information-related functions and the MAC-low layer performs functions sensitive to a time delay in relation to handover of an MSS. In the handover method, when an MSS in the wireless communication system performs handover between Access Points (APs), session information is managed at a fixed position by an Access Point Controller (APC) including an MAC-high layer or a serving AP. Therefore, the system load can be reduced and communication quality can be improved.

6 Claims, 10 Drawing Sheets

U.S. PATENT DOCUMENTS

| | | |
|---|---|---|
| 7,054,316 B2 * | 5/2006 | Cheng et al. |
| 7,085,232 B1 * | 8/2006 | Raissinia et al. |
| 7,206,581 B2 * | 4/2007 | Zhang et al. |
| 7,376,879 B2 * | 5/2008 | Terry et al. |
| 2002/0001296 A1 * | 1/2002 | Lee et al. |
| 2002/0196760 A1 * | 12/2002 | Malomsoky et al. |
| 2003/0035423 A1 * | 2/2003 | Beckmann et al. .......... 370/390 |
| 2003/0128681 A1 * | 7/2003 | Rauschmayer .............. 370/338 |
| 2003/0212821 A1 * | 11/2003 | Gillies et al. ................ 709/238 |
| 2004/0246898 A1 * | 12/2004 | Peisa et al. .................. 370/235 |
| 2005/0002363 A1 * | 1/2005 | Cheng et al. ................ 370/338 |
| 2005/0063347 A1 * | 3/2005 | Sarkkinen et al. ........... 370/338 |
| 2005/0135403 A1 * | 6/2005 | Ketchum et al. ............ 370/437 |
| 2005/0135416 A1 * | 6/2005 | Ketchum et al. ............ 370/469 |

* cited by examiner

DIVIDED MAC PROTOCOL STRUCTURE, DATA TRANSMISSION AND RECEPTION METHOD, AND HANDOVER METHOD AND SYSTEM USING THE STRUCTURE IN A WIRELESS COMMUNICATION SYSTEM

PRIORITY

This application claims priority to an application entitled "Divided MAC Protocol structure, Data Transmission/Reception Method and Handover Method and System using the structure in Wireless Communication System" filed in the Korean Intellectual Property Office on Mar. 5, 2004 and assigned Serial No. 2004-15987, the contents of which are incorporated herein by reference.

BACKGROUND OF THE INVENTION

1. Field of the Invention

The present invention relates generally to a communication protocol structure, a data transmission/reception method, and a handover method of a Mobile Subscriber Station (MSS) in a wireless communication system, and more particularly to a divided Media Access Control (MAC) protocol structure, and a data transmission and reception method, and a handover method and system using the structure in a wireless communication system, which reduces the load of the wireless communication system using session information and improves communication quality.

2. Description of the Related Art

Currently, with the development of the mobile communication industry and the increased demand for an Internet service, the need for a mobile communication system capable of efficiently providing a wireless Internet service is increasing more and more. Because an existing mobile communication network has been developed to provide a voice-centered service, it has disadvantages in that a data transmission bandwidth is relatively narrow and service charge is expensive.

An Institute of Electrical and Electronics Engineers (IEEE) 802.16e standardization group of the IEEE, which is one of an international standardization organization, is pushing establishment of an IEEE 802.16d standard, which is to be used as the standard for providing a wireless broadband Internet service to a fixed subscriber station. Simultaneously, the IEEE 802.16e standardization group is pushing the establishment of the IEEE 802.16e standard by improving the IEEE 802.16d standard in order to provide the wireless broadband Internet service to an MSS.

Compared with a conventional wireless technology for a voice service, the IEEE 802.16d standard and the IEEE 802.16e standard enable mass storage data to be transmitted within a short time due to a wide bandwidth of data and enable channels to be efficiently used due to the sharing of the channels by all users. However, the IEEE 802.16d standard does not reflect an MSS because it considers only a fixed subscriber station. Further, because the IEEE 802.16e standard, which is being developed for providing a wireless Internet service to an MSS by improving the IEEE 802.16d standard, has also been developed on the basis of the IEEE 802.16d standard, the IEEE 802.16e standard does not sufficiently have the functions required for providing the service to the MSS. A representative service function for the MSS may include a handover function, a paging function, a power consumption saving function, etc. From among these functions, the handover function is an essential function in providing the service to the MSS.

The handover function changes an Access Point (AP) providing a communication service to the MSS due to the movement of the MSS. Accordingly, in order to continuously provide the communication service to the MSS, it is essential to retain session information between the MSS and the AP performing the handover. The session information includes a transmission state of data, functions and characteristics of the MSS, functions and characteristics of the AP, authentication information for the MSS, etc., which are required for communication between the MSS and the AP.

Figure 1:
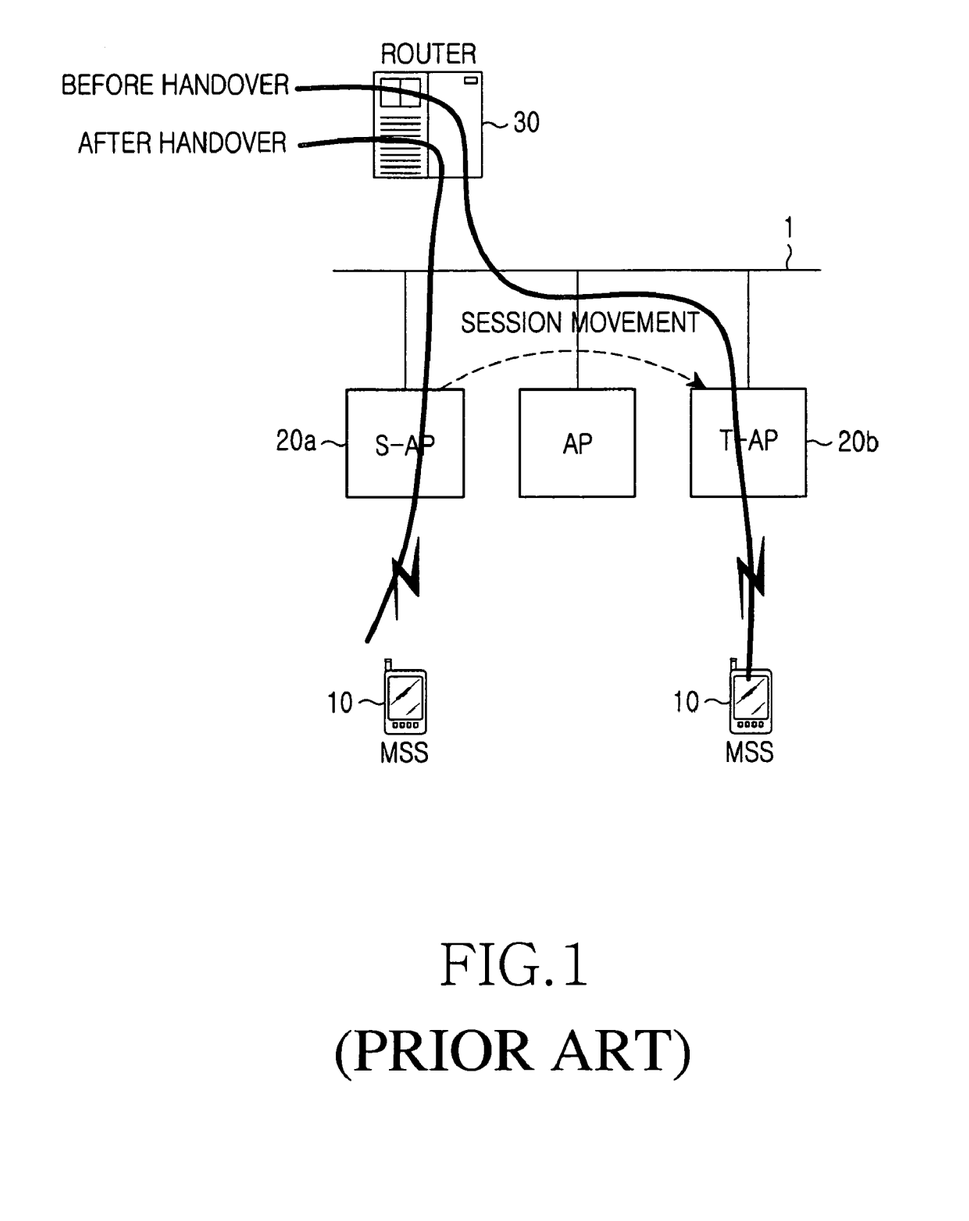
FIG. 1 is a diagram illustrating a conventional handover process of an MSS in a wireless communication system.

FIG. 1 is a diagram illustrating a conventional handover process of an MSS in a broadband wireless communication system. Referring to FIG. 1, an MSS 10 is connected to an Access Point (AP) 20a or 20b through a wireless network. The APs 20a and 20b are connected to a router 30 through a wire network 1, such that the MSS 10 and the APs 20a and 20b transmit/receive packet data to/from an external Internet Protocol (IP) network such as an Internet. Further, session information between the MSS 10 and the APs 20a and 20b is stored in both the MSS 10 and the APs 20a and 20b. Accordingly, the MSS 10 and the APs 20a and 20b continuously manage the same session information.

However, when the MSS 10 moves from a currently connected Serving AP (S-AP) 20a and is handed over to a newly connected Target AP (T-AP) 20b, the MSS 10 may continuously manage the already stored session information regardless of the handover. However, because the T-AP 20b does not know the session information managed by the S-AP 20a, it is difficult to manage the same session information.

Accordingly, the handover process of the MSS 10 requires transfer of the session information between the S-AP 20a and the T-AP 20b and the establishment of new session information between the MSS 10 and the T-AP 20b. However, when a large quantity of session information must be transferred to the T-AP 20b in the handover, it takes more time to transfer the session information and establish the new session information. In addition, the MSS 10 does not receive a service from the S-AP 20a and the T-AP 20b during the transfer of the session information and the establishment of new session information.

SUMMARY OF THE INVENTION

Accordingly, the present invention has been designed to solve the above and other problems occurring in the prior art. It is an object of the present invention to provide a MAC protocol structure that is divided into a MAC-high layer for managing session information and a MAC-low layer for transmitting data to a physical layer, and a wireless communication system using the MAC protocol structure.

It is another object of the present invention to provide a MAC protocol structure, which minimizes the transfer of session information between APs in handover of an MSS, and a wireless communication system using the MAC protocol structure.

It is further another object of the present invention to provide an uplink and/or downlink data transmission method in a wireless communication system using a divided MAC protocol structure.

It is still another object of the present invention to provide a handover method in a wireless communication system, which reduces the load of the wireless communication system and improves communication quality when an MSS performs a handover.

In accordance with one aspect of the present invention, there is provided a MAC (Media Access Control) protocol structure for packet communication in a wireless communication system. The MAC protocol structure includes: a MAC-high layer including at least one sublayer for fixedly managing session information for packet transmission; a MAC-low layer divided from the MAC-low layer, for transferring a data block between the MAC-high layer and a physical layer; and a tunneling layer for generating predetermined tunneling header information as address information for data transmission between the MAC-high layer and the MAC-low layer.

In accordance with another aspect of the present invention, there is provided a MAC (Media Access Control) protocol structure for packet communication in a wireless communication system. The MAC protocol structure includes: a MAC-high layer including at least one sublayer for fixedly managing session information for the packet communication with an MSS (Mobile Subscriber Station); and a MAC-low layer divided from the MAC-low layer, for variably adjusting a size of a PDU (Protocol Data Unit) block exchanged between the MAC-high layer and a physical layer according to conditions of wireless channels.

In accordance with further another aspect of the present invention, there is provided a method for transmitting a packet of an IP (Internet Protocol) network to an MSS (Mobile Subscriber Station) in a downlink of a wireless communication system using a MAC (Media Access Control) protocol. The method includes the steps of: dividing, by a MAC-high layer, the packet received through the IP network into a plurality of ARQ (Automatic Repeat Request) blocks; transmitting, by the MAC-high layer, at least one ARQ block to a MAC-low layer together with predetermined header information for transmission of the ARQ block; receiving, by the MAC-low layer, the ARQ block based on the header information and assembling the received ARQ block into a PDU (Protocol Data Unit) block for being transmitted to the MSS; and transmitting, by the MAC-low layer, the assembled PDU block to the MSS.

In accordance with still another aspect of the present invention, there is provided a method for transmitting transmission data of an MSS (Mobile Subscriber Station) to an IP (Internet Protocol) network in an uplink of a wireless communication system using a MAC (Media Access Control) protocol. The method includes the steps of: receiving, by a MAC-low layer, the transmission data of the MSS through a physical layer; extracting, by the MAC-low layer, at least one ARQ (Automatic Repeat Request) block contained in the transmission data; transmitting, by the MAC-low layer, at least one ARQ block to a MAC-high layer together with predetermined header information for transmission of the ARQ block; and receiving, by the MAC-high layer, said at least one ARQ block, assembling said at least one ARQ block into a packet, and transmitting the packet to an IP (Internet Protocol) network.

In accordance with yet another aspect of the present invention, there is provided a handover method performed between a serving AP (Access Point) and a target AP to which an MSS (Mobile Subscriber Station) is handed over in a wireless communication system using a MAC (Media Access Control) protocol. The method includes the steps of: performing, by the MSS, a channel scanning and determining handover to the target AP; receiving a handover request of the MSS through the serving AP; checking if the handover of the MSS to the target AP is possible; transmitting a handover command to the target AP; and transmitting a PDU (Protocol Data Unit) block excepting for session information to the target AP.

In accordance with yet another aspect of the present invention, there is provided a wireless communication system for performing packet communication utilizing a MAC (Media Access Control) protocol. The system includes: at least one APC (Access Point Controller) including a MAC-high layer containing at least one sublayer for fixedly managing session information for the packet communication; and a plurality of APs (Access Points) including a MAC-low layer for transmitting a PDU (Protocol Data Unit) block between the MAC-high layer and a physical layer to which an MSS (Mobile Subscriber Station) is connected.

In accordance with yet another aspect of the present invention, there is provided a wireless communication system for performing packet communication utilizing a MAC (Media Access Control) protocol. The system includes: a plurality of APs (Access Points) including a MAC-high layer and a MAC-low layer, the MAC-high layer containing at least one sublayer for fixedly managing session information for the packet communication, the MAC-low layer being divided from the MAC-high layer and transmitting a PDU (Protocol Data Unit) block between the MAC-high layer and a physical layer; and an MSS (Mobile Subscriber Station) that enables the MAC-low layer to shift from a first AP to a second AP to which the MSS is handed over, the session information being fixed in the MAC-high layer of the currently connected first AP from among the APs.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configuration incorporated herein will be omitted when it may obscure the subject matter of the present invention.

First, to help the understanding of the present invention, the conventional structure of an MAC protocol, a session information management method and a handover method, which are defined in an IEEE 802.16e, will be briefly described with reference to FIGS. 2 and 3.

Figure 2:
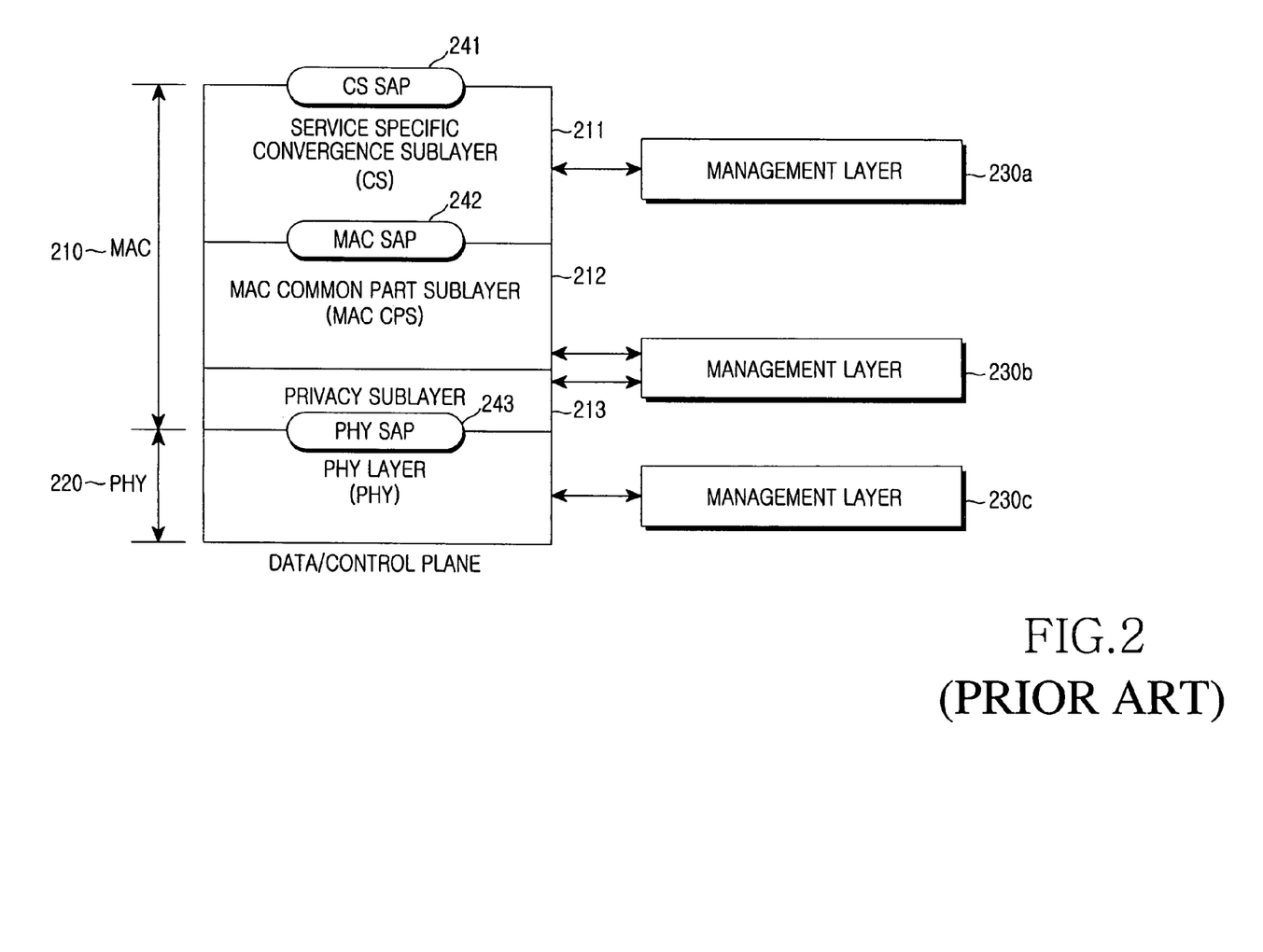
FIG. 2 is a diagram illustrating the conventional structure of a communication protocol relating to handover in a wireless communication system, which is defined in the IEEE 802.16e.

FIG. 2 is a diagram illustrating the conventional structure of a handover-related communication protocol in a broadband wireless communication system, which is defined in the IEEE 802.16e. As illustrated in FIG. 2, a layer taking part in the handover in the broadband wireless communication system includes a MAC layer 210, a PHY layer 220 (physical layer), and a plurality of management layers 230a to 230c for respectively managing the MAC layer 210 and the PHY layer 220. The MAC layer 210 includes a service specific convergence sublayer 211, a MAC common part sublayer 212, and a privacy sublayer 213. Each of the sublayers is mutually connected through Service Access Points (SAPs) 241 to 243.

The MAC layer 210 defined in the IEEE 802.16e has a characteristic in which it has a connection structure of the MAC common part sublayer 212 and the privacy sublayer 213, similar to an MAC layer structure defined in an IEEE 802.16d. The protocol structure as described above defines that the MAC layer 210 and the PHY layer 220 are combined in a fixed structure, and defines that all session information relating to handover of an MSS must be stored in an AP.

The handover of the IEEE 802.16e supporting the mobility of an MSS is performed based on the protocol as illustrated in FIG. 2. A handover process in the IEEE 802.16e broadband wireless communication system will be described with reference to the example of FIG. 1.

Referring to FIG. 1, when the wireless channel conditions of the currently connected S-AP 20a, which are monitored by the MSS 10, worsen, the MSS 10 monitors the wireless channels of neighbor APs in order to perform handover.

Further, when the MSS 10 determines that it must be handed over to a neighbor AP, the MSS 10 transmits a Handover Request (HO-REQ) message to the S-AP 20a. The S-AP 20a checks neighbor AP information contained in the HO-REQ message and transmits a predetermined Handover Response (HO-RSP) message, which includes information for the T-AP 20b to which the MSS 10 is to be handed over, to the MSS 10. The MSS 10 having received the HO-RSP message from the S-AP 20a transmits a predetermined Handover confirm (HO-confirm) message to the T-AP 20b, and attempts connection with the T-AP 20b.

Figure 3:
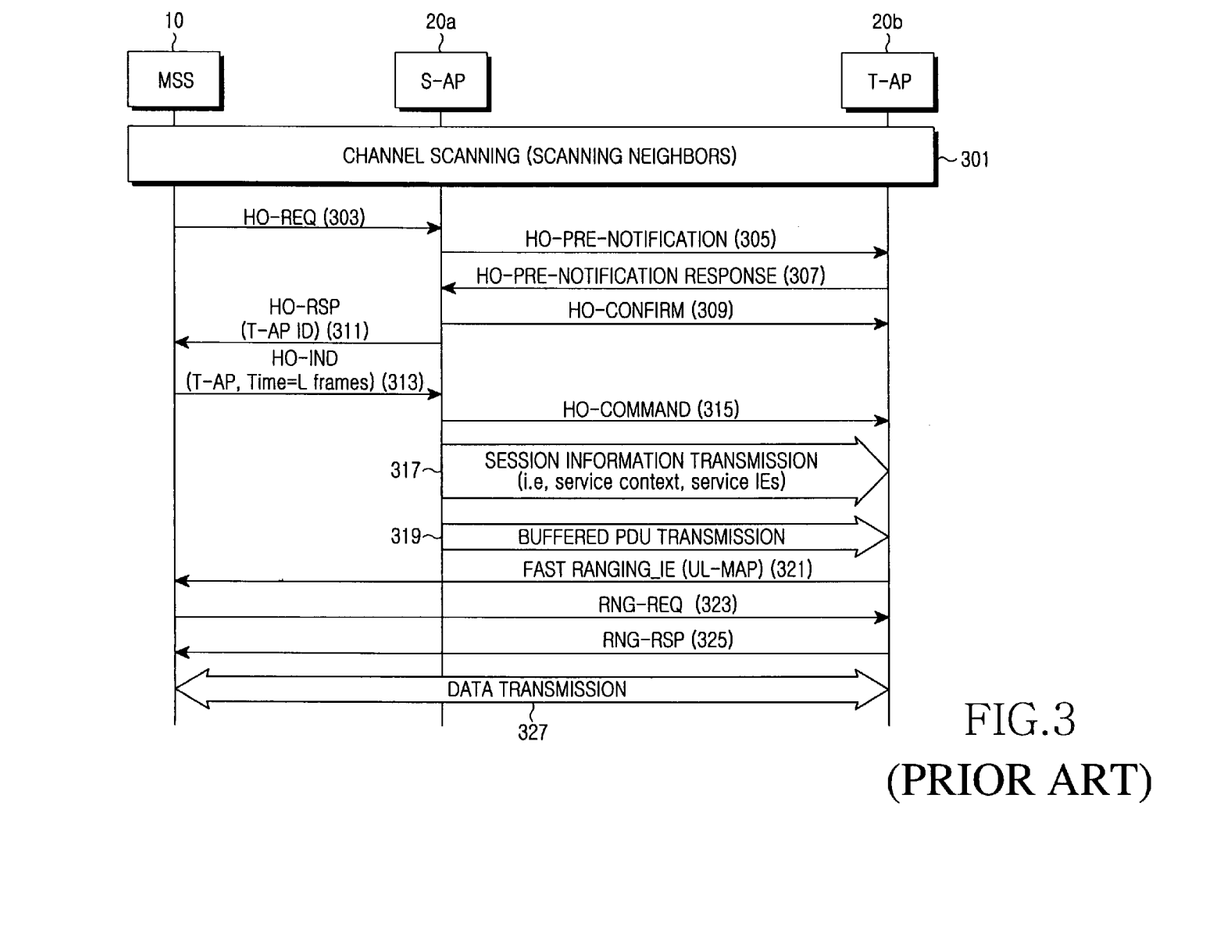
FIG. 3 is a diagram illustrating a conventional handover process in a wireless communication system, which is defined in the IEEE 802.16e.

FIG. 3 is a diagram illustrating a handover process in a broadband wireless communication system, which is defined in the IEEE 802.16e. Referring to FIG. 3, in step 301, the MSS 10 of FIG. 1 acquires information for a neighbor AP through a channel scanning. In step 303, the MSS 10 transmits a HO-REQ message to the S-AP 20a. In step 305, the S-AP 20a, having received the HO-REQ message, transmits a HO-pre-notification message to the T-AP 20b and notifies the T-AP 20b that the MSS 10 is to be handed over to the T-AP 20b. In step 307, the T-AP 20b transmits a HO-pre-notification-response message to the S-AP 20a and permits the handover of the MSS 10.

In step 309, the S-AP 20a, having received the HO-pre-notification-response message, transmits a HO-confirm message to the T-AP 20b as a response for reception of the HO-pre-notification-response message. In addition, in step 311, the S-AP 20a transmits a HO-RSP message including an identifier (T-AP ID) of the T-AP 20b to the MSS 10 and reports the T-AP 20b to which the MSS 10 is to be handed over.

Thereafter, when a final handover time arrives, the MSS 10 transmits a Handover Indication (HO-IND) message to the S-AP 20a and notifies the S-AP 20a that the MSS 10 starts the handover after an L frame in step 313. In step 315, the S-AP 20a transmits a Handover command (HO-command), which reports that the MSS 10 is to be handed over to the T-AP 20b after the L frame, to the T-AP 20b, and reports the handover start of the MSS 10. In steps 317 and 319, the S-AP 20a transmits already stored session information (e.g., service context, service IEs, etc.) and user data blocks (i.e., Protocol Data Units (PDUs)) of the MSS 10 to the T-AP 20b.

In step 321, the T-AP 20b transfers a Fast Ranging Information Element (Fast Ranging_IE) of an uplink MAP defined in the IEEE 802.16e to the MSS 10, so that the MSS 10 can quickly send a ranging request to the T-AP 20b. Accordingly, when the MSS 10 transmits a ranging request (RNG-REQ) message to the T-AP 20b in step 323, the T-AP 20b transmits a ranging response (RNG-RSP) message to the MSS 10 in response to the RNG-REQ message in step 325. Thereafter, when the aforementioned process is ended, the MSS 10 synchronizes with the T-AP 20b. Accordingly, it is possible to transmit and receive data through the corresponding T-AP 20b in step 327.

However, when a large quantity of session information must be transmitted from the S-AP to the T-AP during the performance of the handover as described above, it takes more time to transfer the session information and establish a new session in the T-AP. In addition, a service provided to the MSS may be temporarily interrupted during the transfer of the session information and the establishment of the new session.

In order to solve these problems, the present invention proposes a new MAC protocol structure for the broadband wireless communication system. That is, the present invention introduces a divided MAC layer structure, which is obtained by dividing a MAC layer into a MAC-high layer and a MAC-low layer in a communication protocol structure of an AP, fixedly assigns a session-related function of MAC functions to the MAC-low layer, and assigns functions sensitive to a delay time in relation to the handover of the MSS to the MAC-low layer.

Further, the present invention proposes a session management method of the broadband wireless communication system, in which the MAC-high layer manages session information and data can be transferred between the MAC-high layer and the MAC-low layer divided from the MAC-low layer, such that it is unnecessary to transfer the session information between APs in the handover of the MSS.

Furthermore, the present invention proposes a handover method of the broadband wireless communication system, which can omit the transfer of the session information and the resetting process of the session information by means of the divided MAC protocol structure.

Figure 4:
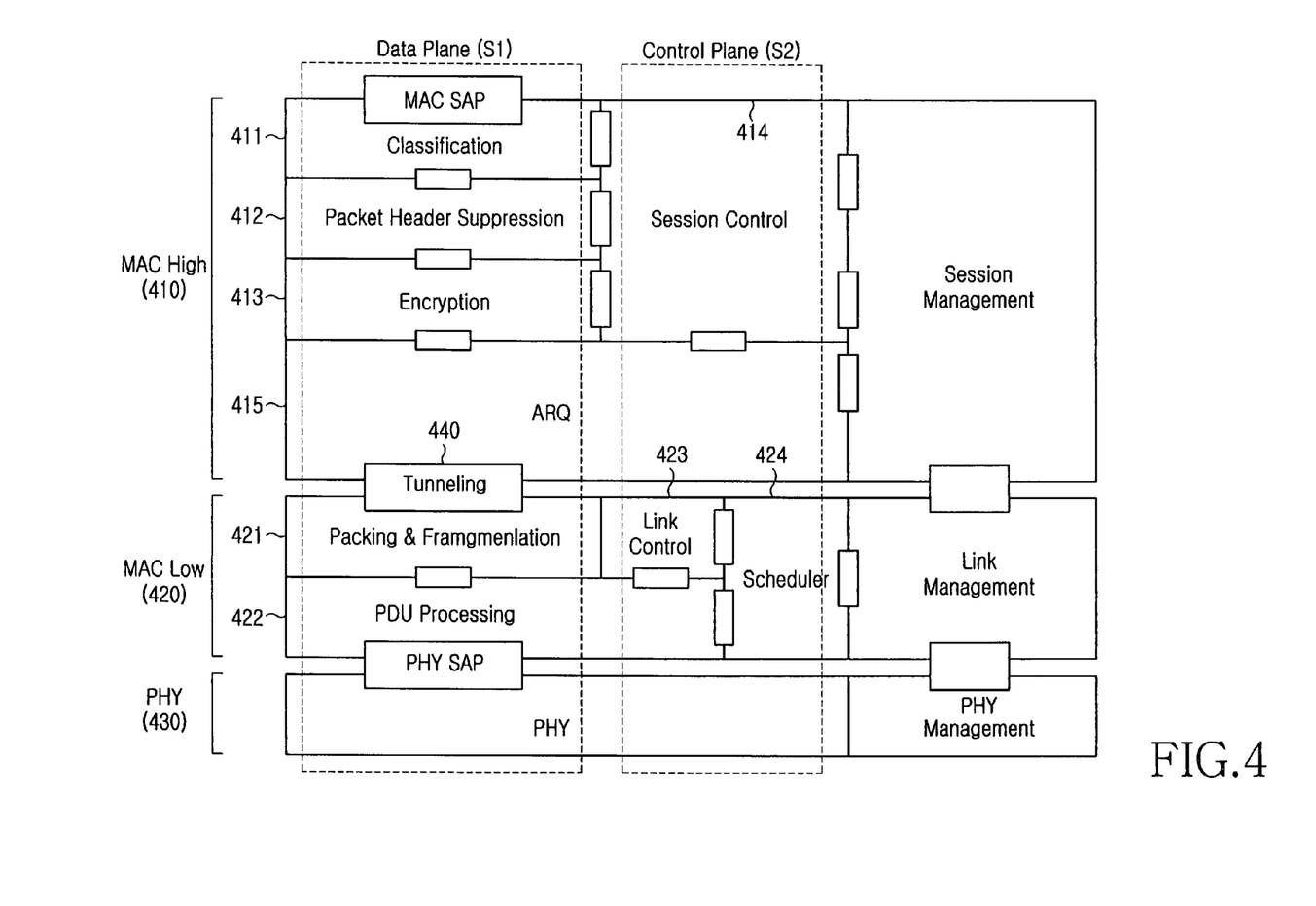
FIG. 4 is a diagram illustrating the divided MAC protocol structure of a wireless communication system according to an embodiment of the present invention.

FIG. 4 is a diagram illustrating a divided MAC protocol structure of the broadband wireless communication system according to the present invention. In FIG. 4, a MAC-high layer 410 may be applied to an Access Point Controller (APC). Further, a MAC-low layer 420, which is connected to MAC-high layer 410 by a divided structure, may be applied to an AP performing data transmission and reception with an MSS.

The MAC structure of FIG. 4 includes the MAC-high layer 410, the MAC-low layer 420, and a PHY layer 430 (physical layer). The MAC-high layer 410 controls a session management function relating to the handover of the MSS and is located at a fixed point of a network. The position of MAC-high layer 410 does not change even though an AP changes due to the handover of the MSS. However, the MAC-low layer 420 has a position shifting to a neighbor AP of the MSS in the handover of the MSS, takes charge of functions sensitive to a delay time such as a direct communication function with the MSS, and enables high speed communication to be performed with the MSS.

In FIG. 4, the MAC-high layer 410 includes a classification layer 411, a packet header suppression layer 412, an encryption layer 413, a session control layer 414, and an Automatic Repeat Request (ARQ) layer 415 as a session-related layer. Further, the MAC-low layer 420 includes a packing & fragmentation layer 421, a PDU processing layer 422, and a link control layer 423 as a layer relating to a delay time when a handover is performed.

Further, to transmit data between the MAC-high layer 410 having a position fixed in the APC and the MAC-low layer 420 having a position changing according to movement of the MSS, a tunneling layer 440 of FIG. 4 generates a predetermined tunneling header including a sequence number of ARQ blocks transmitted from the MAC-high layer 410 to the MAC-low layer 420 and an MAC-low layer address to which the ARQ blocks are transmitted, and adds the generated tunneling header to the ARQ blocks.

When the MAC-low layer 420 receives a MAC PDU from the MSS, the tunneling layer 440 immediately adds a tunneling header, which includes the sequence number of the ARQ blocks and an MAC-high layer address to which the ARQ blocks are transmitted, to the received MAC PDU, and transmits the MAC PDU to the MAC-high layer 410, in order to send the MAC PDU to the ARQ layer 415 in the MAC-high layer 410.

Table 1 shows layers corresponding to each other in the MAC structure of the present invention illustrated in FIG. 4 and the conventional MAC structure illustrated in FIG. 1.

TABLE 1

| Classification | MAC structure of present invention | conventional MAC structure |
|---|---|---|
| MAC-high layer 410 | classification layer 411 packet header suppression layer 412 | service specific convergence sublayer 211 |
| | Encryption layer 413 | privacy sublayer 213 |
| | session control layer 414 | service specific convergence sublayer 211 & MAC common part sublayer 212 |
| | ARQ layer 415 | MAC common part sublayer 212 |
| MAC-low layer 420 | packing & fragmentation layer 421 PDU processing layer 422 link control layer 423 | |

Hereinafter, the layers included in the MAC-high layer 410 and the MAC-low layer 420 will be described in detail.

First, the classification layer 411 of the MAC-high layer 410 receives an IP packet, determines the characteristics of the packet according to the types of a service, selects a connection, i.e., logical channel, proper for transmitting the IP packet, and transmits the IP packet to the packet header suppression layer 412 (lower layer) through a corresponding logical channel. Further, the classification layer 411 stores and manages the characteristics of each IP packet according to the types of the service, and determines Quality of Service (QoS) according to the characteristics of the packet. Because the characteristics of the packet or the QoS is not only information which must be retained during relatively long time but also information which must be continuously retained even though an MSS performs a handover, the characteristics of the packet or the QoS is contained in session information.

Further, the packet header suppression layer 412 of the MAC-high layer 410 suppresses the header of the IP packet received from the classification layer 411 (upper layer) and transmits the suppressed IP packet to the encryption layer 413 (lower layer), thereby improving the transmission efficiency. A suppression process of each packet is influenced by the suppression setting of a previous packet. Accordingly, even though the MSS performs the handover, because information for the suppression setting of the packet must be continuously retained, the information must be contained in the MAC-high layer 410. Because a detailed suppression method conforms to the standard of an IEEE 802.16d, the detailed description will be omitted.

Further, because it is possible for another MSS to access data exchanged between an MSS and an AP according to the characteristics of an IEEE 802.16e system, the encryption layer 413 of the MAC-high layer 410 encrypts data transmitted from the AP to the MSS in order to prevent another MSS from decrypting the data.

Further, when the MSS sends encrypted data to the AP, the encryption layer 413 decrypts the encrypted data and transfers the decrypted data to the packet header suppression layer 412 (upper layer). Herein, because predetermined encryption keys are set in the MSS and the AP, and continuously retained for the aforementioned encryption, the encryption layer 413 must be included in the MAC-high layer 410. More specifically, because it takes more time to initially set encryption keys according to the characteristics of an encryption algorithm, the encryption function must continuously retain the session even though the MSS performs the handover.

The ARQ layer 415 of the MAC-high layer 410 performs a retransmission when an error occurs during data transmission in connection of a logical channel, which must ensure the reliability of packet transmission. In the retransmission operation, a transmission side constructs the ARQ blocks by the predefined block size and transmits the ARQ blocks, a reception side assembles the received ARQ blocks and requests a retransmission for an ARQ block including an error, and the transmission side, having received the retransmission request, retransmits the same ARQ block stored in an ARQ window.

The ARQ block represents a basic unit for data transmission in the broadband wireless communication system. For example, for forward transmission, the transmission side corresponds to an APC and the reception side corresponds to an AP controlled by the APC.

For the operation described above, the transmission side must store an ARQ block, which has been transmitted for satisfying the retransmission request of the reception side, in the ARQ window. The ARQ block stored in the ARQ window is just retransmitted when the retransmission request is received from the reception side. Then, when the reception side transmits a confirmation signal, which represents that the reception side has normally received the ARQ block, to the transmission side, the transmission side deletes the corresponding ARQ block from the ARQ window. A space remaining after the deletion of the ARQ block is used again when the transmission side transmits a new ARQ block to the reception side. Further, the ARQ layer 415 manages a Block Sequence Number (BSN) in order to sequentially arrange the transmitted ARQ blocks in sequence, inserts a corresponding BSN into each ARQ block whenever the ARQ block is transmitted, and transmits the ARQ block.

When it is necessary to process mass storage data, the ARQ layer 415 requires the ARQ window for storing a plurality of the ARQ blocks. That is, the broadband wireless communication system to which the present invention is applied uses the ARQ window having a capacity that is larger than that of an ARQ window in an existing wireless communication system. Accordingly, in the present invention, because the ARQ layer 415 is included in the MAC-high layer 410, it is not required to change the ARQ window even though the MSS performs the handover.

As described above, in the broadband wireless communication system to which the present invention is applied, it is preferred that the classification layer 411, the packet header suppression layer 412, the encryption layer 413, and the ARQ layer 415 continuously retain the session for the MSS in the fixed point of the network. Accordingly, the session control layer 414 of the MAC-high layer 410 is a layer for transmitting and receiving a control message relating to a function required for retaining a session to and from the MSS, and the control message is transferred through the logical channel.

The packing & fragmentation layer 421 and the PDU processing layer 422 in the MAC-low layer 420 are layers for efficiently using a bandwidth assigned to each MSS. Further, the packing & fragmentation layer 421 and the PDU processing layer 422 assemble each ARQ block transmitted from the MAC-high layer 410 into one large transmission block (PDU block) that is actually transmitted. The transmission block has a size determined by an internal scheduler 424. The scheduler 424 determines the optimal size of the transmission block considering the conditions of wireless channels and load of traffic. Herein, wireless resources can be efficiently used when there is a small discrepancy between conditions and transmission time of the wireless channels. Accordingly, the packing & fragmentation layer 421 and the PDU processing layer 422 are located in the MAC-low layer 420.

The packing & fragmentation layer 421 assembles the ARQ blocks according to the size of the PDU block determined by the scheduler 424 in data transmission. Further, the packing & fragmentation layer 421 adds a packing subheader or a fragment subheader to the assembled ARQ blocks as the situation requires, or removes the packing/fragment subheader from data received from the PDU processing layer 422 (lower layer) and transmits the data to the MAC-high layer 410.

Herein, the packing subheader is a header for converting a packet transmitted to the MSS, that is, a service data unit, into one MAC PDU, and transmitting the MAC PDU, as is known in the art. The fragment subheader is a header for dividing the service data unit and transmitting the service data unit, when it is impossible to convert the service data unit into one MAC PDU due to the big size of the service data unit.

The PDU processing layer 422 generates the PDU block (transmission block, i.e., MAC PDU) by adding a MAC header to the packing/fragment subheader received from the packing & fragmentation layer 421, and transfers the PDU block to the PHY layer 430. Herein, the PDU block may include a plurality of subheader blocks (either packing subheader (PSH) or fragmentation subheader (FSH)).

Further, because the subheader blocks generally include fields for reporting the start, medium, and end of a payload, the MSS can exactly receive the divided and transmitted PDU blocks. Further, the PDU processing layer 422 extracts a PDU block from data, which are received from the PHY layer 430, by the MAC header when data are received from the MSS, separates the MAC header from the PDU block, and transmits the PDU block to the packing & fragmentation layer 421 (upper layer).

The link control layer 423 in the MAC-low layer 420 exchanges the state of the MSS and scheduling information with the MSS in order to transfer a final MAC PDU. Further, various scheduling and control messages generated by the link control layer 423 must be quickly transferred to the MSS through the PDU processing layer 422 in order to prevent a service delay for the MSS. Accordingly, the link control layer 423 is included in the MAC-low layer 420.

In the aforementioned embodiment, the MAC-high layer fixedly manages the session information. However, when it is necessary to move the MAC-high layer due to a delay caused by a network delay or abnormality, it is preferred to move the session information to another MAC-low layer.

Figure 5:
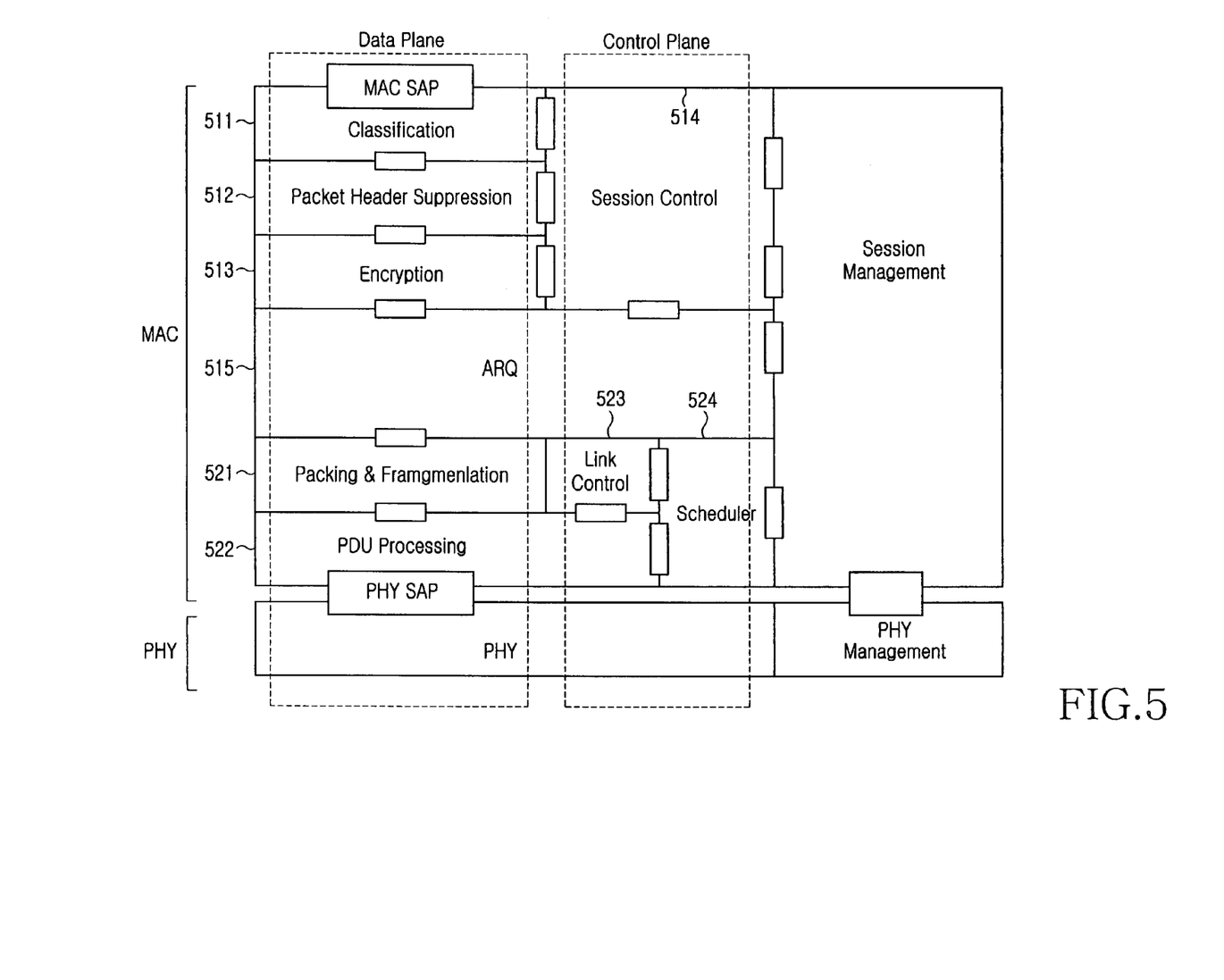
FIG. 5 is a diagram illustrating the MAC protocol structure of an MSS in a wireless communication system according to an embodiment of the present invention.

FIG. 5 is a diagram illustrating the MAC protocol structure of the MSS in the broadband wireless communication system according to the present invention. As illustrated in FIG. 5, the MAC protocol structure is an integrated MAC structure obtained by combining the MAC-high layer and the MAC-low layer. Herein, because the sublayers 511 to 515 and 521 to 524 in FIG. 5 have the same basic operations as those of the sublayers 411 to 415 and 421 to 424 in FIG. 4, the detailed description will be omitted. Further, because the MAC structure of FIG. 5 is not divided into the MAC-high layer and the MAC-low layer, the tunneling layer 440 for connecting the MAC-high layer to the MAC-low layer as illustrated in FIG. 4 is not necessary.

In the present invention, the MAC-high layer is located in the APC, etc., the MAC-low layer is located in the AP, etc., and session information is managed through a fixed APC in the handover of the MSS. Further, the MAC-low layer fixes a session position by changing the position of the MAC-low layer to a neighbor AP of the MSS, such that data of an IP network is transmitted downward to the MSS or data of the MSS is transmitted upward to the IP network.

Figure 6:
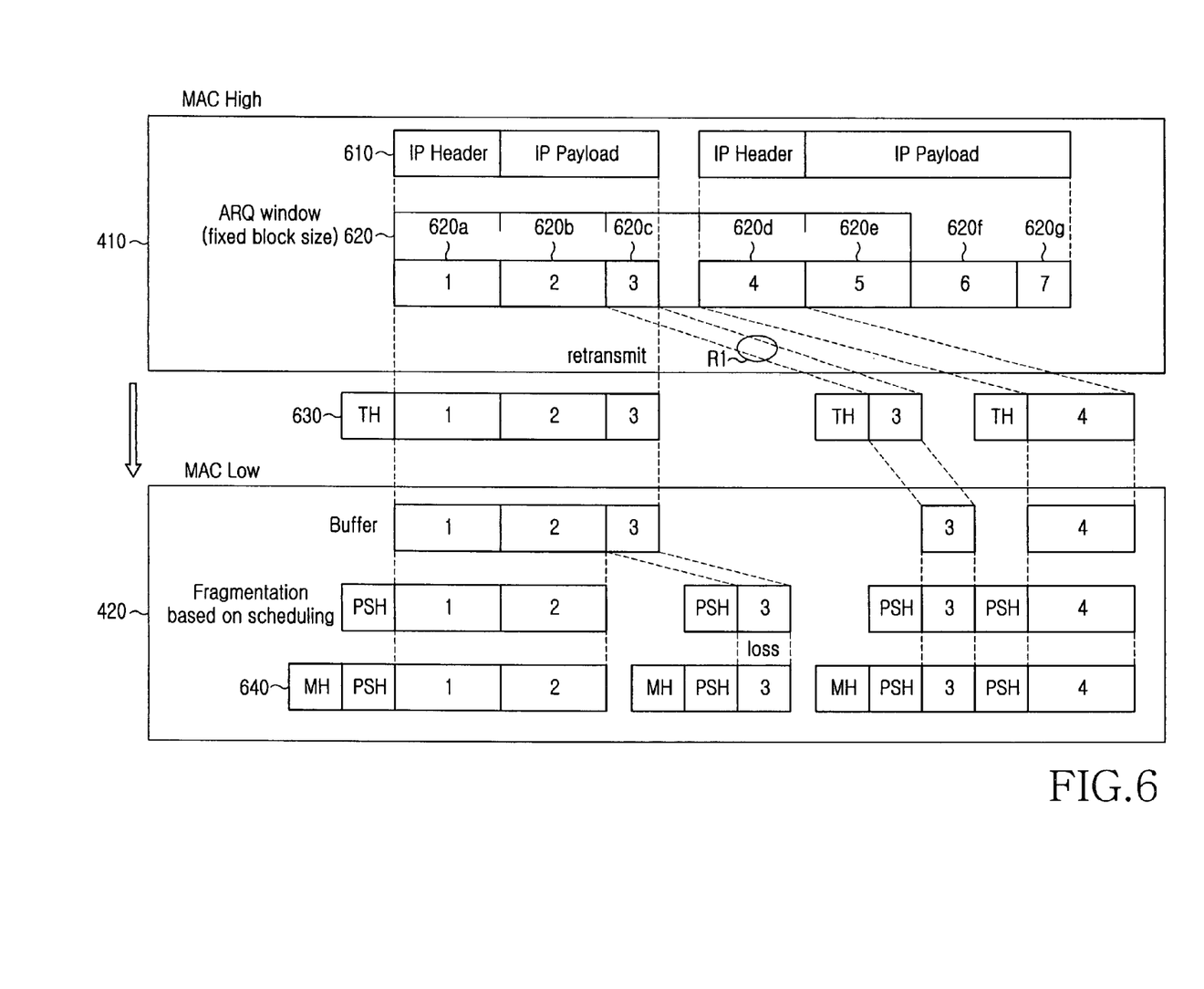
FIG. 6 is a diagram illustrating a data transmission process in a downlink in the wireless communication system using the MAC protocol structure of FIG. 4.

FIG. 6 is a diagram illustrating a data transmission process in a downlink in the broadband wireless communication system using the MAC protocol structure illustrated in FIG. 4. With reference to FIG. 6, a process will be described, in which a packet received from the MAC-high layer is transmitted to the MAC-low layer to generate a PDU block. Thereafter, the PDU block is transmitted to the MSS.

A data plane S1 between the MAC-high layer 410 and the MAC-low layer 420 is connected through the tunneling layer 440. Accordingly, it is possible to connect the MAC-high layer 410, which is located at the fixed point of the APC, etc., to the MAC-low layer 420, which is located at a random point and may be connected to the MSS, through the tunneling layer 440. Further, the MAC-low layer 420 is directly connected to the PHY layer 430, thereby quickly responding to the request of the MSS.

In FIG. 6, because the ARQ layer 415 is located in the MAC-high layer 410, an ARQ window 620 for storing an ARQ block is also located in the MAC-high layer 410. A packet 610 received in the classification layer 411 through an external IP network is divided into a plurality of ARQ blocks 620a to 620g as illustrated in FIG. 6, is temporarily stored in the ARQ window 620, and is then transferred to the MAC-low layer 420.

FIG. 6 illustrates an example in which the ARQ window 620 has enough size to include the ARQ blocks 620a to 620e. After the ARQ blocks 620a to 620e have been completely transmitted, the ARQ blocks 620f and 620g are transmitted.

In the present invention, an ARQ block 630 including a tunneling header (TH) is transferred from the MAC-high layer 410 to the MAC-low layer 420. The tunneling header is generated by the tunneling layer 440 of FIG. 4 and records the BSNs of each ARQ block and the MAC address of the MAC-low layer 420.

The MAC-low layer 420 stores the ARQ blocks received from the MAC-high layer 410 in a buffer 635, the stored ARQ blocks are generated into a PDU block 640, which is a transmission block transmitted to the MSS through the packing & fragmentation layer 421, and the PDU processing layer 422 according to the band assigned by the scheduler 424. Further, the ARQ blocks are transmitted to the MAC-low layer 420 according to the data retransmission process R1 marked by dashed lines. The reference number R1 indicates the retransmission process of the $3^{rd}$ ARQ block.

Further, in FIG. 6, the PSH is the aforementioned packing subheader and the MH is the MAC header. Because a procedure required for generating other PDU blocks conforms to the existing 802.16d standard, the detailed description will be omitted.

Figure 7:
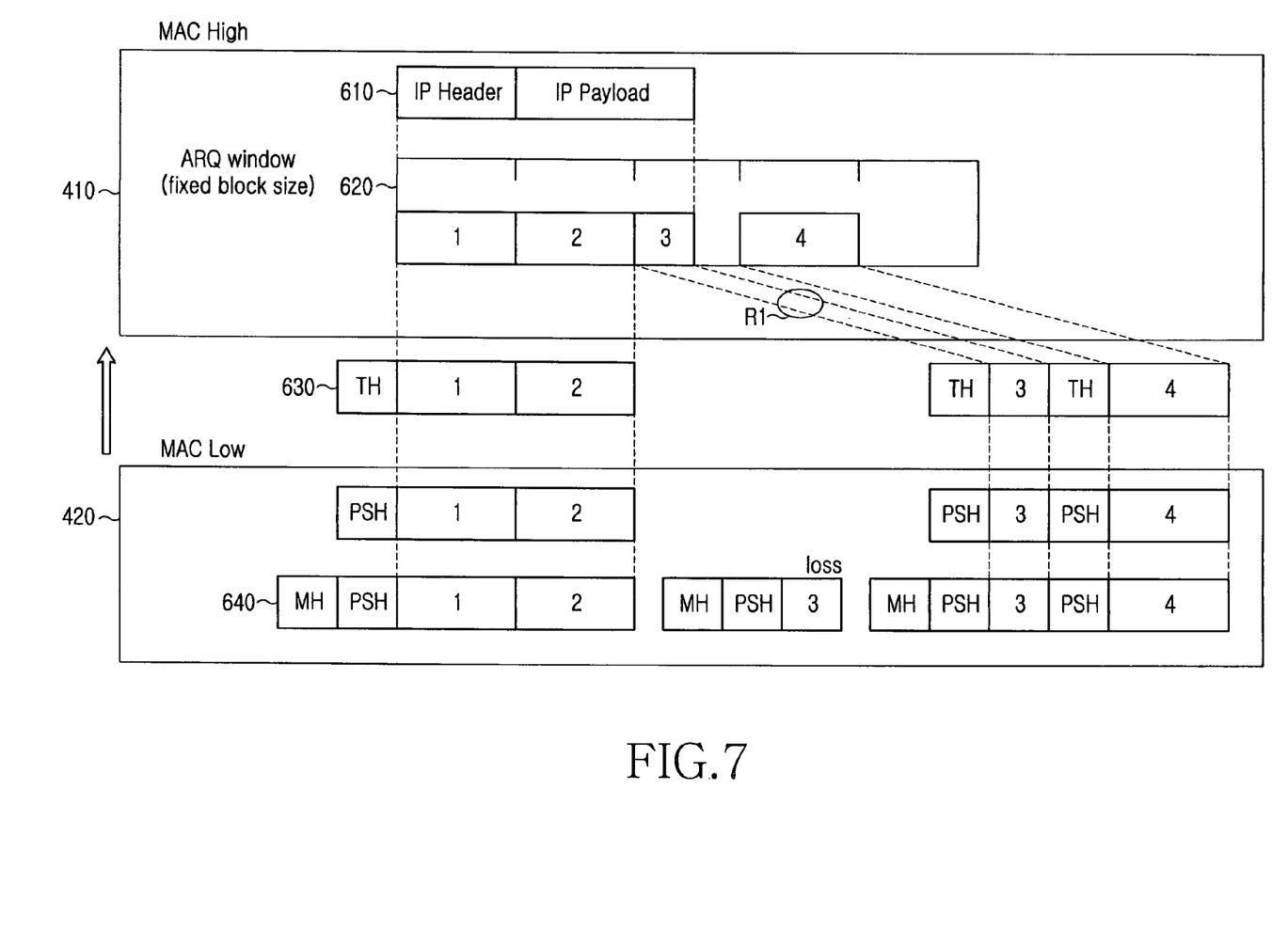
FIG. 7 is a diagram illustrating a data transmission process in an uplink in the wireless communication system using the MAC protocol structure of FIG. 4.

FIG. 7 is a diagram illustrating a data transmission process in an uplink in the broadband wireless communication system using the MAC protocol structure illustrated in FIG. 4. In FIG. 7, a process will be described, in which a PDU block received from the MAC-low layer is transmitted to the MAC-high layer in order to be generated into a packet, and the packet is transmitted to the IP network. Further, in FIG. 7, elements equal to those in FIG. 6 have the same reference numbers and the detailed description for the elements will be omitted.

Referring to FIG. 7, the MAC-low layer 420 transmits the ARQ blocks divided from the PDU block 640 received from the PHY layer 430 to the MAC-high layer 410 and the tunneling layer 440 adds the tunneling header (TH), which includes the BSNs of ARQ blocks and the MAC address of the MAC-high layer 410, to the ARQ blocks, and transmits ARQ blocks, to which the tunneling header is added, to the MAC-high layer 410. The ARQ layer 415 in the MAC-high layer 410 assembles the received ARQ blocks, makes a request for the MAC-low layer 420 to retransmit an ARQ block including an error, generates the packet 610 by means of finally assembled ARQ blocks, and transmits the packet 610 to the external IP network through the router.

According to the operations described in FIGS. 6 to 7, after the MAC-high layer 410 is fixed in the APC, etc., data is transmitted to the MAC-low layer 420 of an AP, which has a position changing according to movement of the MSS, or data received in the MAC-low layer 420 located in a random position is transmitted to the MAC-high layer 410 having a fixed position. Therefore, the session information managed by the MAC-high layer 410 can be fixedly retained.

Figure 8:
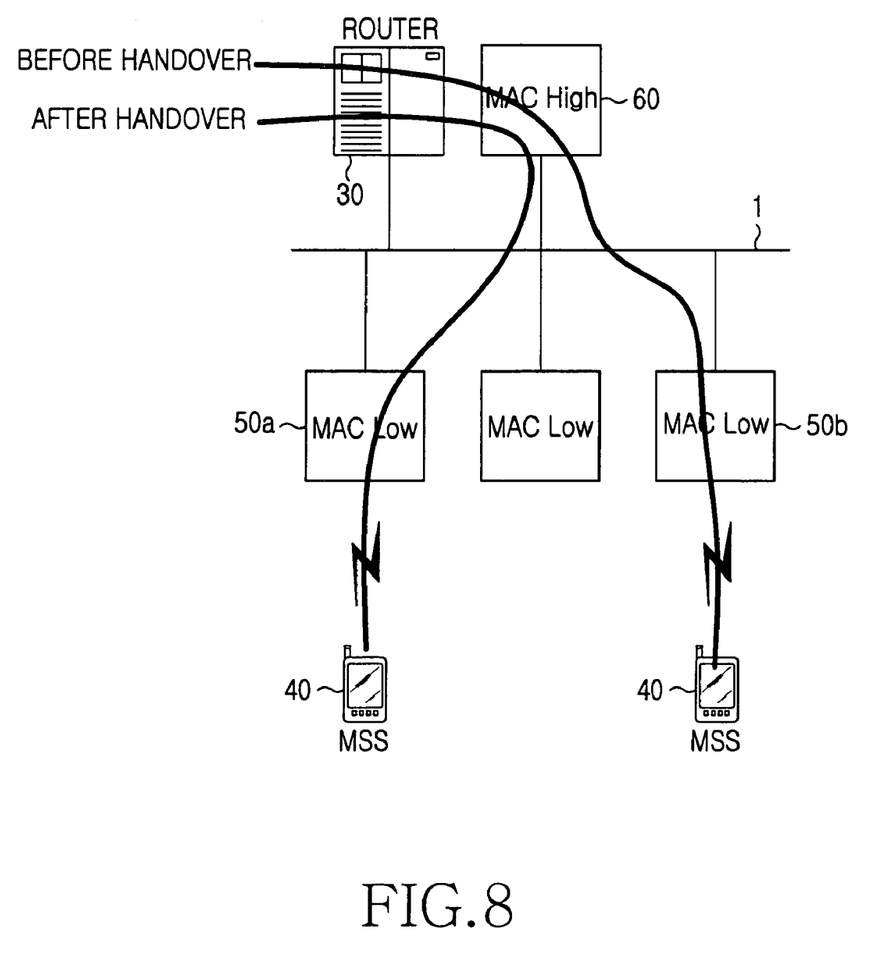
FIG. 8 is a block diagram illustrating a wireless communication system employing a handover method according to an embodiment of the present invention.

FIG. 8 is a block diagram illustrating the broadband wireless communication system utilizing the handover method according to an embodiment of the present invention. This represents a handover model having the divided MAC structure in which the aforementioned MAC-high layer is located in at least one APC 60 and a plurality of MAC-low layers are located in APs 50a and 50b. Further, it is assumed that the AP 50a is the S-AP and the AP 50b is the T-AP when handover is performed.

In FIG. 8, an MSS 40 is connected to the APs 50a and 50b through a wireless network, the APs 50a and 50b are connected to the APC 60 through a wire network, and the APC 60 is connected to the IP network such as an Internet through a router 30. The MSS 40 and the APC 60 retain the same session information, and the APs 50a and 50b include only MAC-low layers divided from the MAC-high layer managing the session information, such that transfer of the session information is not required when the MSS 40 performs handover. Further, downlink transmission data of the MAC-high layer is transferred to the MAC-low layers through the aforementioned tunneling layer, and is then transmitted to the MSS 40.

In FIG. 8, because the MAC-high layer is connected to the MAC-low layers through an IP tunnel, there is no restriction on the relative position between them. Further, because the MAC-high layer manages the session information at a fixed position, a delay time is reduced in a downlink data transmission. Furthermore, because the transfer of session information does not occur in the handover of the MSS 40, handover load in the broadband wireless communication system is reduced.

Figure 9:
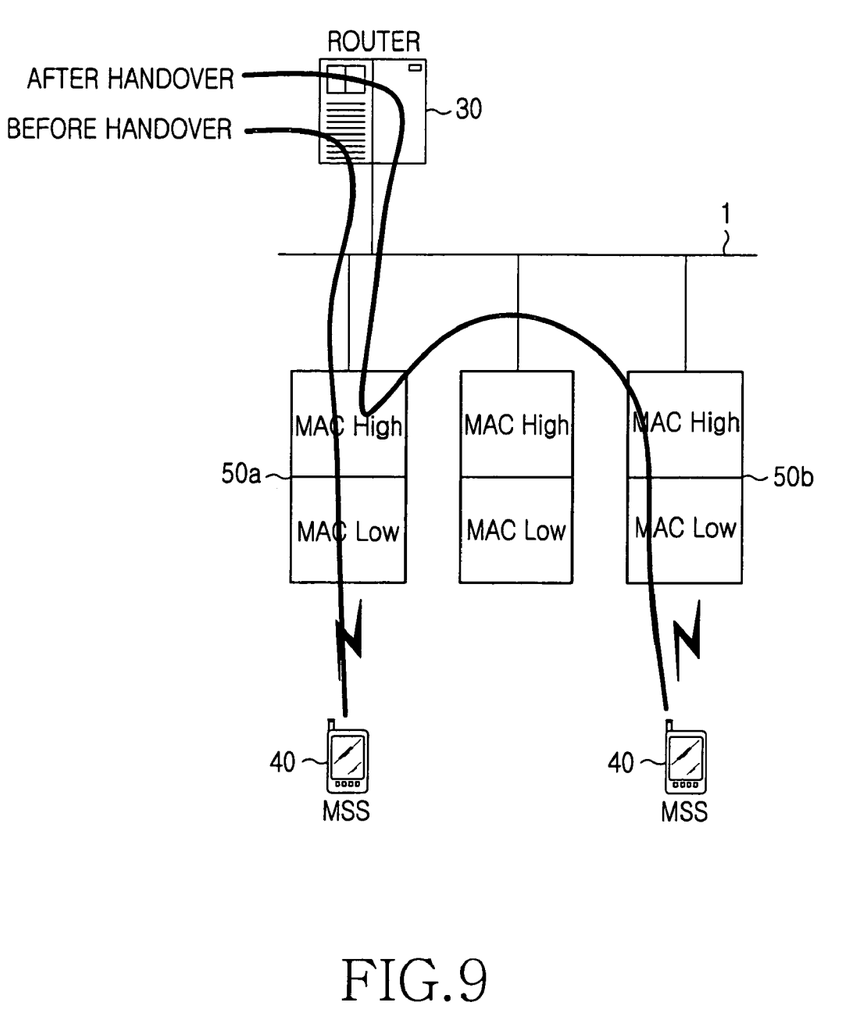
FIG. 9 is a block diagram illustrating a wireless communication system employing a handover method according to an embodiment of the present invention.

FIG. 9 is a block diagram illustrating the broadband wireless communication system using the handover method according to an embodiment of the present invention. More specifically, FIG. 9 illustrates a handover model having a hybrid MAC structure in which the MAC protocol is divided into the MAC-high layers and the MAC-low layers and each pair of the MAC-high layer and the MAC-low layer is located in the AP 50a or the AP 50b. Further, it is assumed that the AP 50a is the S-AP and the AP 50b is the T-AP when handover is performed.

In FIG. 9, the entire MAC structure is contained in the APs 50a and 50b, similarly to the conventional model of FIG. 1. However, user data can be transmitted from the MAC-high layer to the MAC-low layer located in another AP through the tunneling layer. In such a case, because the MAC-high layer having a fixed position manages the session information, it is unnecessary to transfer the session information in the handover of the MSS 40. Therefore, a stable service can be provided.

Further, because each of the APs 50a and 50b has the same shape, it is easy to install the APs 50a and 50b.

Figure 10:
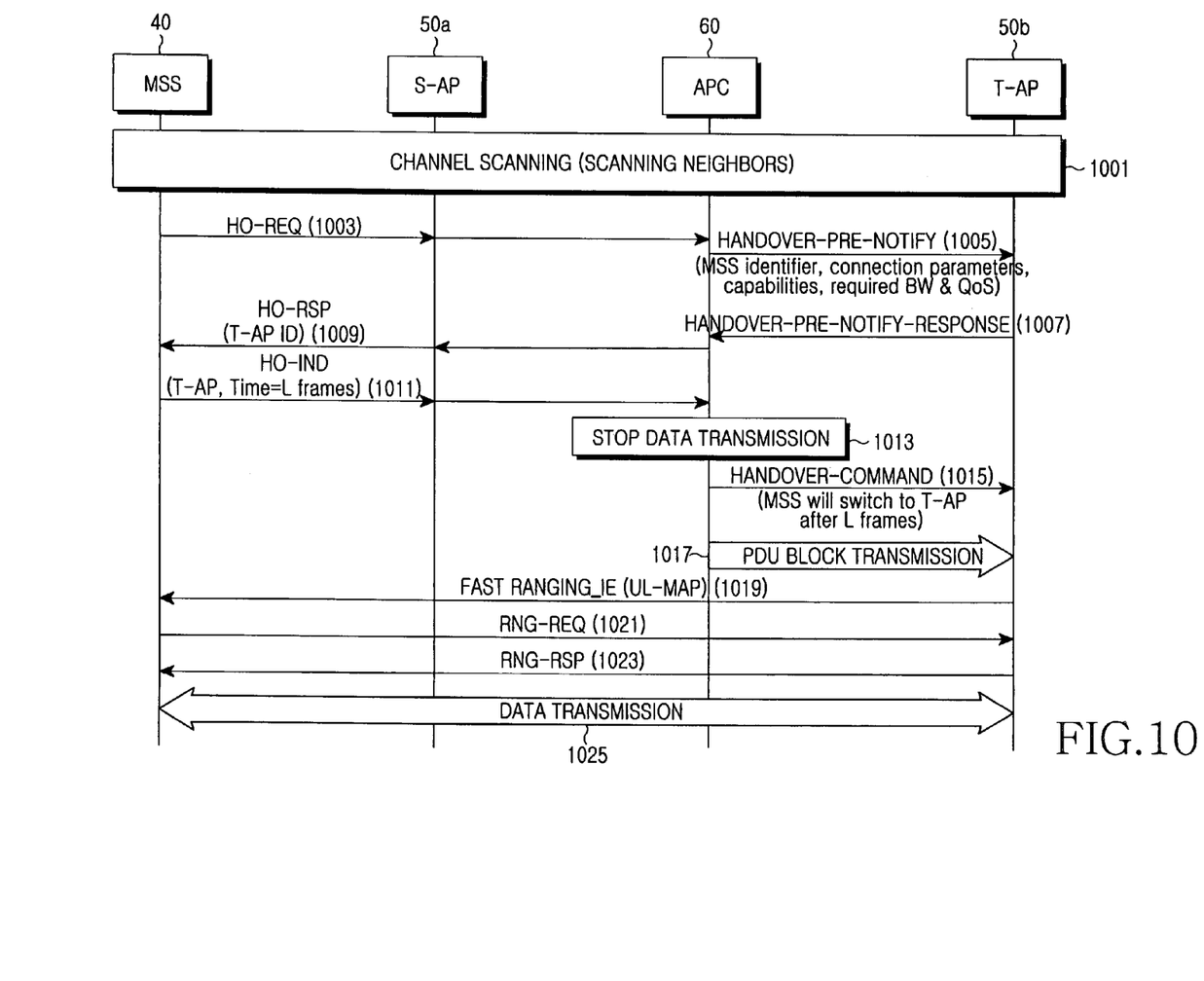
FIG. 10 is a flow diagram illustrating a handover process in a wireless communication system according to an embodiment of the present invention.

FIG. 10 is a flow diagram illustrating a handover process in the broadband wireless communication system according to the present invention. More specifically, FIG. 10 represents the handover process in the divided type of model illustrated in FIG. 8. In the description in FIG. 10, it is assumed that the MAC-high layer is located in the APC 60 and the MAC-low layers are respectively located in the S-AP 50a connected to the MSS 40 and the T-AP 50b to which the MSS 40 is to be handed over.

In step 1001, the MSS 40 acquires information for a neighbor AP through a channel scanning, finds the T-AP 50b, and determines handover. In step 1003, the MSS 40 transmits a HO-REQ to the S-AP 50a and the HO-REQ is transferred to the APC 60. In step 1005, the APC 60 determines if the handover of the MSS 40 may be performed by transmitting a handover-pre-notify to the T-AP 50b to which the MSS 40 is to be handed over. In this process, the T-AP 50b receives characteristic information, e.g., bandwidth requested by the MSS or QoS, of the MSS 40 from the APC 60, and determines if the T-AP 50b may permit the handover of the MSS 40.

In step 1007, the T-AP 50b sends a handover-pre-notify-response to the APC 60 in response to the handover-pre-notify. In step 1009, the APC 60 informs the MSS 40 that the handover to the T-AP 50b is possible, by sending a HO-RSP including an identification ID (T-AP ID) of the T-AP 50b to the MSS 40. Then, in step 1011, when a final handover time arrives, the MSS 40 transmits a HO-IND representing the start of the handover after an L frame the APC 60 through the S-AP 50a.

In step 1013, after the APC 60 temporarily stops downlink data transmission to the MSS 40, the APC 60 transmits a handover-command representing that the MSS 40 is to be handed over to the T-AP 50b after the L frame to the T-AP 50b. Further, in steps 1015 and 1017, the APC 60 transmits user data buffered in the APC 60 to the T-AP 50b so that the T-AP 50*b* can directly transmit the user data (PDU blocks) to the MSS 40 when the MSS 40 has been handed over to the T-AP 50*b*.

Herein, because the session information, such as MSS authentication, BSN of an ARQ block, and QoS of an MSS, is managed by the APC 60, the session information is not transmitted to the T-AP 50*b*. Further, the amount of the user data transmitted from the APC 60 to the T-AP 50*b* in the handover is greatly reduced because it has only to transmit only data in the ARQ window.

In step 1019, the T-AP 50*b* enables the MSS 40 to quickly send a ranging request using the Fast Ranging_JE defined in the IEEE 802.16e. Further, the MSS 40 transmits an RNG-REQ to the T-AP 50*b* in step 1021 and the T-AP 50*b* transmits an RNG-RSP to the MSS 40 in response to the RNG-REQ in step 1023. When the process as described above is ended, the MSS 40 synchronizes with the T-AP 50*b*. Accordingly, the MSS 40 transmits and receives data through the T-AP 50*b* in step 1025.

According to the present invention as described above, because session information is not transferred between APs when an MSS performs handover in a broadband wireless communication system, the system load can be reduced. Further, according to the present invention, a handover process between an MSS and an AP can be simplified, and a handover can be quickly performed due to the reduction of a delay time through the fixing of session information.

Furthermore, according to the present invention, it is possible to use various handover models in which a MAC structure may be divided into a MAC-high layer and a MAC-low layer, such that the flexibility of a system design can be ensured.

Although preferred embodiments of the present invention have been described for illustrative purposes, those skilled in the art will appreciate that various modifications, additions, and substitutions are possible, without departing from the scope and spirit of the present invention as disclosed in the accompanying claims, including the full scope of equivalents thereof.

What is claimed is:

1. A method for transmitting a packet of an IP (Internet Protocol) network to an MSS (Mobile Subscriber Station) in a downlink of a wireless communication system using a MAC (Media Access Control) protocol, the method comprising the steps of:

segmenting, by a MAC-high layer, the packet received through the IP network into a plurality of ARQ (Automatic Repeat Request) blocks;

transmitting, by the MAC-high layer, at least one ARQ block to an MAC-low layer together with predetermined header information for transmission of the ARQ block;

receiving, by the MAC-low layer, the ARQ block based on the header information;

assembling the received ARQ block into a PDU (Protocol Data Unit) block for being transmitted to the MSS; and transmitting, by the MAC-low layer, the assembled PDU block to the MSS, wherein the MAC protocol is separated into the MAC-high layer and the MAC-low layer, the MAC-high layer managing session information and having a fixed position, and the MAC-low layer being connected to a physical layer and having a variable position.

2. The method in claim 1, wherein the MAC-high layer is located in an APC (Access Point Controller) of the wireless communication system, and the MAC-low layer is located in an AP (Access Point) and changes its position according to movement of the MSS connected to the physical layer.

3. The method in claim 1, wherein the header information includes a BSN (Block Sequence Number) of the ARQ block and address information of the MAC-low layer.

4. A method for transmitting transmission data of an MSS (Mobile Subscriber Station) to an IP (Internet Protocol) network in an uplink of a wireless communication system using a MAC (Media Access Control) protocol, the method comprising the steps of:

receiving, by a MAC-low layer, the transmission data of the MSS through a physical layer;

extracting, by the MAC-low layer, at least one ARQ (Automatic Repeat Request) block contained in the transmission data;

transmitting, by the MAC-low layer, at least one ARQ block to a MAC-high layer together with predetermined header information for transmission of the ARQ block;

receiving, by the MAC-high layer, said at least one ARQ block;

assembling said at least one ARQ block into a packet; and transmitting the packet to an IP (Internet Protocol) network, wherein the MAC protocol is divided into the MAC-high layer and the MAC-low layer, the MAC-high layer managing session information and having a fixed position, the MAC-low layer being connected to a physical layer and having a variable position.

5. The method in claim 4, wherein the MAC-high layer is located in an APC (Access Point Controller) of the wireless communication system, and the MAC-low layer is located in an AP (Access Point) and changes its position according to movement of the MSS connected to the physical layer.

6. The method in claim 4, wherein a basic unit of the data transmitted to the MAC-high layer includes at least one ARQ block segmented from the PDU and a tunneling header (TH) having a BSN (Block Sequence Number) of the ARQ block and the MAC address of the MAC-high layer.

* * * * *